United States Patent
Liao et al.

(10) Patent No.: US 11,634,563 B2
(45) Date of Patent: Apr. 25, 2023

(54) EPOXIDIZED NATURAL RUBBER COMPOSITE AND PREPARATION PROCESS THEREOF

(71) Applicant: Hainan University, Haikou (CN)

(72) Inventors: Shuangquan Liao, Haikou (CN); Changjin Yang, Haikou (CN); Zheng Peng, Haikou (CN); Yanchan Wei, Haikou (CN); Lusheng Liao, Haikou (CN)

(73) Assignee: Hainan University, Haikou (CN)

( * ) Notice: Subject to any disclaimer, the term of this patent is extended or adjusted under 35 U.S.C. 154(b) by 279 days.

(21) Appl. No.: 17/141,540

(22) Filed: Jan. 5, 2021

(65) Prior Publication Data

US 2021/0214532 A1 Jul. 15, 2021

(30) Foreign Application Priority Data

Jan. 13, 2020 (CN) .......................... 202010031171.6

(51) Int. Cl.
*C08L 15/00* (2006.01)
*C08K 13/04* (2006.01)
*C08H 1/00* (2006.01)

(52) U.S. Cl.
CPC ................ *C08L 15/00* (2013.01); *C08H 1/00* (2013.01); *C08K 13/04* (2013.01); *C08L 2201/08* (2013.01)

(58) Field of Classification Search
CPC ............ C08L 15/00; C08K 13/04; C08H 1/00
USPC ........................................................ 524/15
See application file for complete search history.

(56) References Cited

FOREIGN PATENT DOCUMENTS

WO WO-2013133380 A1 * 9/2013 ............... B60C 1/00

\* cited by examiner

*Primary Examiner* — Deve V Hall
(74) *Attorney, Agent, or Firm* — Dicke, Billig & Czaja, PLLC

(57) ABSTRACT

The present disclosure provides an epoxidized natural rubber composite and a preparation process thereof, and relates to the technical field of rubber materials. The epoxidized natural rubber composite provided by the present disclosure comprises the following preparation raw materials in parts by weight: 100 parts of epoxidized natural rubber, 1~30 parts of peanut meal, 0.05~0.8 parts of surfactants, 0.1~4 parts of coagulant and 0.2~12 parts of vulcanization processing aids. The present disclosure utilizes essential amino acids and non-essential amino acids contained in peanut meal to improve the aging resistance of the epoxidized natural rubber. After hot air aging, ozone aging and ultraviolet aging treatments, both the tensile strength retention rate and the elongation at break retention rate of the epoxidized natural rubber composites of the present disclosure can be kept above 83%.

20 Claims, No Drawings

EPOXIDIZED NATURAL RUBBER COMPOSITE AND PREPARATION PROCESS THEREOF

CROSS-REFERENCE TO RELATED APPLICATIONS

This application is based upon and claims priority to Chinese Patent Application No. 202010031171.6, filed with the China National Intellectual Property Administration on Jan. 13, 2020, the entire contents of which are incorporated herein by reference.

TECHNICAL FIELD

The present disclosure relates to the technical field of rubber materials, and specifically relates to an epoxidized natural rubber composite and a preparation process thereof.

BACKGROUND

Epoxidized natural rubber is a kind of novel polymer obtained from epoxidization of natural rubber, which has excellent air tightness, oil resistance and good adhesiveness, and meanwhile has good wet-skid resistance and low rolling resistance, thus having a broad prospect in the application of high performance green tires.

However, epoxidized natural rubber has a disadvantage of very poor aging-resistant performance. The molecular chain of epoxidized natural rubber contains a large amount of unsaturated double bonds and epoxy groups, which are highly reactive. Epoxidized natural rubber has chemical changes in its macromolecular chain during the utilization due to the effects of external factors such as heat, oxygen, light, mechanical force, radiation, chemical medium, ozone in the air and the like. The original chemical structure of rubber is thereby broken, which leads to the deterioration of rubber properties and further causes the epoxidized natural rubber products prone to aging in the course of processing or utilization, and its aging-resistant performance may be even poorer than that of natural rubber. Therefore, epoxidized natural rubber products generally have the problems of short storage time, short service life, aging and stickiness, thus greatly limiting the application of epoxidized natural rubber.

SUMMARY

An objective of the present disclosure is to provide an epoxidized natural rubber composite and a preparation process thereof, which intends to improve the aging-resistant performance of the epoxidized natural rubber and extend the service life of the epoxidized natural rubber products.

To realize the above objective, the present disclosure provides the following technical solutions:

The present disclosure provides an epoxidized natural rubber composite, which comprises the following preparation raw materials in parts by weight:

100 parts of epoxidized natural rubber, 1~30 parts of peanut meal, 0.05~0.8 parts of surfactants, 0.1~4 parts of coagulant, and 0.2~12 parts of vulcanization processing aids.

Preferably, the epoxidization degree of the epoxidized natural rubber is 2~50.

Preferably, the particle size of the peanut meal is 0.30~0.45 mm.

Preferably, the surfactants are one or more of sodium dodecyl sulfonate, sodium dodecyl sulfate, sodium lignin sulfonate and calcium lignin sulfonate.

Preferably, the coagulant is methanol or ethanol.

Preferably, the vulcanization processing aids are one or more of sulfur, N-t-butyl-2-benzothiazole sulfenamide, zinc oxide and stearic acid.

The present disclosure provides a preparation process of the epoxidized natural rubber composite as described in the above technical solution, which comprises the following steps:

The peanut meal and the surfactants are mixed with water and modified to get modified peanut meal dispersion;

The modified peanut meal dispersion is mixed with the epoxidized natural rubber to get a latex-state compound;

The latex-state compound is mixed with the coagulant, and the resulting materials are successively tableted, granulated and dried to get a dry glue-state compound;

The dry glue-state compound is mixed with the vulcanization processing aids, the resulting materials are successively blended and vulcanized to get the epoxidized natural rubber composite.

Preferably, the temperature for modification is 30~80° C., the time for modification is 5~120 min; and the modification is carried out under ultrasonic conditions with an ultrasonic power of 500~700 W.

Preferably, the mass ratio of water to the epoxidized natural rubber is 1:0.6~1.

Preferably, the modified peanut meal dispersion is mixed with the epoxidized natural rubber under ultrasonic conditions with an ultrasonic power of 500~700 W for a period of 0.1~2 h at a mixing temperature of 30~80° C.

The present disclosure provides an epoxidized natural rubber composite, which comprises the following preparation raw materials in parts by weight: 100 parts of epoxidized natural rubber, 1~30 parts of peanut meal, 0.05~0.8 parts of surfactants, 0.1~4 parts of coagulant, and 0.2~12 parts of vulcanization processing aids. The present disclosure utilizes the essential amino acids and non-essential amino acids contained in the peanut meal to chemically react with the free radicals generated during the aging of epoxidized natural rubber, thereby slowing down the aging of the epoxidized natural rubber and improving the aging-resistant performance of the epoxidized natural rubber. Additionally, amino acids in the peanut meal can also react with epoxy groups in the epoxidized natural rubber, which can enhance the stability of epoxy groups during the aging of the epoxidized natural rubber, and further improve the aging-resistant performance of the epoxidized natural rubber. It can be known from the data documented in the examples that, after hot air aging, ozone aging and ultraviolet aging treatments, both the tensile strength retention rate and the elongation at break retention rate of the epoxidized natural rubber composites of the present disclosure can be kept above 83%. Compared to the common epoxidized natural rubber composite, the epoxidized natural rubber composites of the present disclosure have the advantages of significantly improved hot air aging resistance, ozone aging resistance and ultraviolet aging resistance.

The present disclosure provides a preparation process of the epoxidized natural rubber composite, which does not affect the processability and physical and mechanical properties of the rubber compounds, and the utilized peanut meal has low cost, the process is simple and feasible for industrial production, and the quality of products is stable. The epoxidized natural rubber composites prepared by the present disclosure have good mechanical properties, low thermal properties, and good fatigue resistance performances, which can be used in medical latex products, shoe soles, tires, rubber hoses and other epoxidized natural rubber products.

DETAILED DESCRIPTION

The present disclosure provides an epoxidized natural rubber composite, which comprises the following preparation raw materials in parts by weight:

100 parts of epoxidized natural rubber, 1~30 parts of peanut meal, 0.05~0.8 parts of surfactants, 0.1~4 parts of coagulant, and 0.2~12 parts of vulcanization processing aids.

In the present disclosure, unless otherwise specified, the required preparation raw materials are all commercial goods well known to the persons skilled in the art.

By weight parts, the preparation raw materials of the epoxidized natural rubber composite as provided in the present disclosure include 100 parts of epoxidized natural rubber (on basis of dry glue). In the present disclosure, the epoxidization degree of the epoxidized natural rubber is preferably 2~50, more preferably 10~40, and further preferably 20~30. In the present disclosure, the epoxidized natural rubber composite is preferably in a form of emulsion. The present disclosure has no special requirement on the source of the epoxidized natural rubber, and epoxidized natural rubber of any sources well known to the persons skilled in the art can be used, particularly for example, commercially available milky epoxidized natural rubber. The present disclosure uses the epoxidized natural rubber as the matrix raw material.

Based on the weight parts of the epoxidized natural rubber, the preparation raw materials of the epoxidized natural rubber composite as provided in the present disclosure include 1~30 parts of peanut meal, preferably 5~25 parts, and more preferably 10~20 parts. In the present disclosure, the particle size of the peanut meal is preferably 0.30~0.45 mm, and more preferably 0.35~0.40 mm. Peanut meal is the product obtained after squeezing and refining oil from peanut kernels. Peanut meal is rich in amino acids, and there are totally 18 kinds of amino acids. Moreover, the varieties of essential amino acids are abundant, and their contents are high. The content proportions of total amino acids, essential amino acids and non-essential amino acids in the peanut meal are 39.65%, 10.85%, and 28.80% respectively. The essential amino acids account for 27.36% of the content of the total amino acids, and the ratio of essential amino acids to non-essential amino acids is 0.3767. The present disclosure utilizes the essential amino acids and the non-essential amino acids contained in the peanut meal to improve the aging-resistant performance of the epoxidized natural rubber. The amino acids in the peanut meal can react with the free radicals generated during the aging of epoxidized natural rubber, thereby slowing down the aging of the epoxidized natural rubber and improving the aging-resistant performance of the epoxidized natural rubber. Additionally, amino acids in the peanut meal can react with epoxy groups in the epoxidized natural rubber, which can enhance the stability of epoxy groups during the aging of the epoxidized natural rubber, and further improve the aging-resistant performance of the epoxidized natural rubber.

Based on the weight parts of the epoxidized natural rubber, the preparation raw materials of the epoxidized natural rubber composite as provided in the present disclosure include 0.05~0.8 parts of surfactant, preferably 0.1~0.5 parts, and more preferably 0.2~0.3 parts. In the present disclosure, the surfactant is preferably one or more of sodium dodecyl sulfonate, sodium dodecyl sulfate, sodium lignin sulfonate and calcium lignin sulfonate. When the surfactant is several of the above species, the present disclosure has no special limitation on the proportion of different kinds of surfactants, and any proportion is acceptable. The present disclosure utilizes the surfactants to improve the hydrophilicity of peanut meal and enhance the compatibility between peanut meal and epoxidized natural rubber, thereby in favor of improving the aging-resistant performance of the epoxidized natural rubber composite.

Based on the weight parts of the epoxidized natural rubber, the preparation raw materials of the epoxidized natural rubber composite as provided in the present disclosure include 0.1~4 parts of coagulant, preferably 0.5~3 parts, and more preferably 1~2.5 parts. In the present disclosure, the coagulant is preferably methanol or ethanol. The present disclosure utilizes the coagulant to flocculate or coagulate the latex-state compound for ease of the subsequent formation of the epoxidized natural rubber composite.

Based on the weight parts of the epoxidized natural rubber, the preparation raw materials of the epoxidized natural rubber composite as provided in the present disclosure include 0.2~12 parts of vulcanization processing aids, preferably 2~10 parts, and more preferably 5~8 parts. In the present disclosure, the vulcanization processing aids are preferably one or more of sulfur, N-t-butyl-2-benzothiazole sulfonamide (an accelerator NS), zinc oxide and stearic acid, more preferably a mixture of sulfur, N-t-butyl-2-benzothiazole sulfenamide, zinc oxide and stearic acid, and the mass ratio of sulfur, N-t-butyl-2-benzothiazole sulfenamide, zinc oxide and stearic acid in the mixture is preferably 0.5~2.5: 0.7~2:5~6:1~2, and more preferably 1.5:1.3:5:2. When the vulcanization processing aids are other combinations of the above species, the present disclosure has no special limitation on the proportion of different kinds of vulcanization processing aids, and any proportion is acceptable. The present disclosure utilizes vulcanization processing aids to enable the epoxidized natural rubber composite to form a three-dimensional network structure, thus ensuring the basic structure and mechanical properties of the epoxidized natural rubber composite.

The present disclosure provides a preparation process of the epoxidized natural rubber composite as described in the above technical solution, which comprises the following steps:

The peanut meal and the surfactants are mixed with water and modified to get modified peanut meal dispersion;

The latex-state compound is mixed with the coagulant, and the resulting materials are successively tableted, granulated and dried to get a dry glue-state compound;

The dry glue-state compound is mixed with the vulcanization processing aids, the resulting materials are successively blended and vulcanized to get the epoxidized natural rubber composite.

The present disclosure mixes the peanut meal with the surfactants for modification to generate modified peanut meal dispersion. The present disclosure has no special limitation on the mixing process, and any processes well known in the art can be used. In the present disclosure, the mass ratio of water to the epoxidized natural rubber is preferably 1:0.6~1, and more preferably 1:0.8~0.9; the water is preferably deionized water. In the present disclosure, the modification is preferably carried out in water bath, the temperature for modification is preferably 30~80° C., and more preferably 40~60° C.; the time for modification is preferably 5~120 min, more preferably 10~100 min, and further preferably 30~80 min; the modification is carried out preferably under ultrasonic conditions with an ultrasonic power of preferably 500~700 W, and more preferably 550~650 W. In the present disclosure, during the modification, the peanut meal is ligated with hydrophilic groups in the surfactants, which can improve the hydrophilicity of the peanut meal, thereby enhancing the compatibility between peanut meal and epoxidized natural rubber, and improving the aging-resistant performance of the epoxidized natural rubber.

After obtaining the modified peanut meal dispersion, the present disclosure mixes the modified peanut meal dispersion with the epoxidized natural rubber to get a latex-state compound. In the present disclosure, the modified peanut meal dispersion is mixed with the epoxidized natural rubber preferably under ultrasonic conditions with an ultrasonic power of preferably 500~700 W, and more preferably 550~650 W, for a period of preferably 0.1~2 h, and more preferably 0.5~1.5 h, and the mixing temperature is preferably 30~80° C., and more preferably 50~60° C. During the mixing, amino or hydroxyl groups in the modified peanut meal dispersion react with the epoxy groups in the epoxidized natural rubber, thus further improving the dispersibility of the modified peanut meal dispersion in the epoxidized natural rubber, which is in favor of enhancing the aging-resistant performance of the epoxidized natural rubber.

After obtaining the latex-state compound, the present disclosure mixes the latex-state compound with the coagulant, and the resulting materials are successively tableted, granulated and dried to get the dry glue-state compound. The present disclosure has no special limitation on the means of mixing, tableting, granulation and drying, and any means of mixing, tableting, granulation and drying well known to the persons skilled in the art can be used.

After obtaining the dry glue-state compound, the present disclosure mixes the dry glue-state compound with the vulcanization processing aids, and the resulting materials are successively blended and vulcanized to get the epoxidized natural rubber composite. The present disclosure has no special limitation on the processes of blending and vulcanization, and any processes of blending and vulcanization well known to the persons skilled in the art can be used. In the examples of the present disclosure, blending and vulcanization are specifically carried out in a two-roll mill.

The technical solutions of the present disclosure will be described clearly and fully below in combination with the following examples. Obviously, the described examples are only a part of examples of the present disclosure, rather than the overall examples. Based on the examples of the present disclosure, all other examples obtained by ordinary technicians in the field without making any creative labor shall fall within the scope of protection of the present disclosure.

Example 1 (Ex 1)

By weight parts, 1 part of peanut meal (with particle sizes of 0.3 mm) and 0.05 parts of sodium dodecylbenzene sulfonate were added into 100 parts of deionized water, and then subjected to ultrasonic treatment at an ultrasonic power of 500 W in a water bath at 30° C. continuously for 5 min to get modified peanut meal dispersion. On basis of dry glue, 100 parts of milky epoxidized natural rubber (at an epoxidization degree of 2) was then added and an ultrasonic treatment was continued with stirring at the same conditions for 1.2 h to get a latex-state compound. Then 1.5 parts of methanol was added to coagulate the latex-state compound, which was then tableted, granulated, and dried to get a dry glue-state compound. Then 0.9 parts of sulfur, 1.6 parts of accelerator NS, 5 parts of zinc oxide and 1 part of stearic acid were added into a two-roll mill to mix with the dry glue-state compound for blending and vulcanization to obtain the epoxidized natural rubber composite.

Example 2 (Ex 2)

By weight parts, 30 parts of peanut meal (with particle sizes of 0.45 mm) and 0.8 parts of sodium dodecyl sulfate were added into 100 parts of deionized water, and then subjected to ultrasonic treatment at an ultrasonic power of 700 W in a water bath at 80° C. continuously for 120 min to get modified peanut meal dispersion. On basis of dry glue, 100 parts of milky epoxidized natural rubber (at an epoxidization degree of 50) was then added and an ultrasonic treatment was continued with stirring at the same conditions for 2 h to get a latex-state compound. Then 4 parts of ethanol was added to coagulate the latex-state compound, which was then tableted, granulated, and dried to get a dry glue-state compound. Then 0.7 parts of sulfur, 2 parts of accelerator NS, 6 parts of zinc oxide and 2 parts of stearic acid were added into a two-roll mill to mix with the dry glue-state compound for blending and vulcanization to obtain the epoxidized natural rubber composite.

Example 3 (Ex 3)

By weight parts, 15 parts of peanut meal (with particle sizes of 0.35 mm) and 0.5 parts of sodium lignin sulfonate were added into 100 parts of deionized water, and then subjected to ultrasonic treatment at an ultrasonic power of 500 W in a water bath at 30° C. continuously for 60 min to get modified peanut meal dispersion. On basis of dry glue, 100 parts of milky epoxidized natural rubber (at an epoxidization degree of 40) was then added and an ultrasonic treatment was continued with stirring at the same conditions for 1.5 h to get a latex-state compound. Then 2 parts of ethanol was added to coagulate the latex-state compound, which was then tableted, granulated, and dried to get a dry glue-state compound. Then 0.5 parts of sulfur, 1.5 parts of accelerator NS, 5 parts of zinc oxide and 1.5 parts of stearic acid were added into a two-roll mill to mix with the dry glue-state compound for blending and vulcanization to obtain the epoxidized natural rubber composite.

Example 4 (Ex 4)

By weight parts, 10 parts of peanut meal (with particle sizes of 0.38 mm) and 0.3 parts of sodium dodecyl sulfate were added into 100 parts of deionized water, and then subjected to ultrasonic treatment at an ultrasonic power of 650 W in a water bath at 45° C. continuously for 30 min to get modified peanut meal dispersion. On basis of dry glue, 100 parts of milky epoxidized natural rubber (at an epoxidization degree of 30) was then added and an ultrasonic treatment was continued with stirring at the same conditions for 1 h to get a latex-state compound. Then 2 parts of methanol was added to coagulate the latex-state compound, which was then tableted, granulated, and dried to get a dry glue-state compound. Then 1.5 parts of sulfur, 1.5 parts of accelerator NS, 6 parts of zinc oxide and 2 parts of stearic acid were added into a two-roll mill to mix with the dry glue-state compound for blending and vulcanization to obtain the epoxidized natural rubber composite.

Example 5 (Ex 5)

By weight parts, 25 parts of peanut meal (with particle sizes of 0.42 mm) and 0.3 parts of sodium dodecyl sulfate were added into 100 parts of deionized water, and then subjected to ultrasonic treatment at an ultrasonic power of 600 W in a water bath at 40° C. continuously for 100 min to get modified peanut meal dispersion. On basis of dry glue, 100 parts of milky epoxidized natural rubber (at an epoxidization degree of 10) was then added and an ultrasonic treatment was continued with stirring at the same conditions for 2 h to get a latex-state compound. Then 4 parts of ethanol was added to coagulate the latex-state compound, which was then tableted, granulated, and dried to get a dry glue-state compound. Then 2.5 parts of sulfur, 0.7 parts of accelerator NS, 5 parts of zinc oxide and 1 part of stearic acid were added into a two-roll mill to mix with the dry glue-state compound for blending and vulcanization to obtain the epoxidized natural rubber composite.

Comparative Example (Comp Ex)

The epoxidized natural rubber with an epoxidization degree of 40 (Manufactured by Agricultural Product Processing Research Institute, Chinese Academy of Tropical Agricultural Sciences) was selected for blending and vulcanization processes to get the epoxidized natural rubber composite. The formula of the selected epoxidized natural rubber of the Comparative Example includes 100 parts of epoxidized natural rubber with an epoxidization degree of 40, 5 parts of zinc oxide, 2 parts of stearic acid, 1 part of accelerator NS, 2 parts of sulfur, and 30 parts of white carbon black.

According to the methods specified in GB/T3512-2001 (Rubber, vulcanized or thermoplastic—Accelerated ageing and heat resistance tests), GB/T7762~2003 (Rubber, vulcanized or thermoplastic—Resistance to ozone cracking—Static strain testing), and GB/T16585~1996 (Rubber, vulcanized—Test method of resistance to artificial weathering (Fluorescent UV lamp)), the epoxidized natural rubber composites obtained in Examples 1~5 and the epoxidized natural rubber composite obtained in the Comparative Example were determined for their hot air aging resistance, ozone aging resistance and ultraviolet aging resistance, with the testing results seen in the Table below.

TABLE

Performance testing results of the epoxidized natural rubber composites obtained in examples 1~5 and the comparative example

| Item | | Ex 1 | Ex 2 | Ex 3 | Ex 4 | Ex 5 | Comp Ex |
|---|---|---|---|---|---|---|---|
| Hot air aging resistance | Tensile strength retention rate/% | 90.23 | 89.24 | 91.56 | 93.04 | 91.89 | 77.35 |
| | Elongation at break retention rate/% | 88.12 | 87.38 | 90.23 | 89.29 | 90.01 | 79.56 |
| Ozone aging resistance | Tensile strength retention rate/% | 87.89 | 90.02 | 91.15 | 86.78 | 90.73 | 80.23 |
| | Elongation at break retention rate/% | 86.02 | 90.37 | 90.05 | 87.55 | 89.32 | 81.95 |
| Ultraviolet aging resistance | Tensile strength retention rate/% | 86.82 | 89.21 | 89.11 | 89.66 | 87.85 | 82.66 |
| | Elongation at break retention rate/% | 83.07 | 85.76 | 86.54 | 87.81 | 88.51 | 81.47 |
| Heat build-up/° C. | | 21 | 22 | 20 | 23 | 18 | 29 |

It can be seen from the Table that, after hot air aging, ozone aging and ultraviolet aging treatments, both the tensile strength retention rate and the elongation at break retention rate of the epoxidized natural rubber composites as provided in the present disclosure can be kept above 83%, and compared with the epoxidized natural rubber composite in the Comparative Example, the epoxidized natural rubber composites of the present disclosure have the advantages of significantly improved hot air aging resistance, ozone aging resistance and ultraviolet aging resistance, as well as significantly reduced heat build-up performance; and the preparation process is simple, low in cost and feasible for scale production.

It is known from the above examples that, the present disclosure provides an epoxidized natural rubber composite and a preparation process thereof. After hot air aging, ozone aging and ultraviolet aging treatments, both the tensile strength retention rate and the elongation at break retention rate of the epoxidized natural rubber composites of the present disclosure can be kept above 83%, and compared to the common epoxidized natural rubber composite, the epoxidized natural rubber composites of the present disclosure have the advantages of significantly improved hot air aging resistance, ozone aging resistance and ultraviolet aging resistance.

The foregoing is only preferable implementation of the present disclosure. It should be noted to persons with ordinary skills in the art that several improvements and modifications can be made without deviating from the principle of the present disclosure, which are all considered as the protection scope of the present disclosure.

What is claimed is:

1. An epoxidized natural rubber composite, wherein, it comprises the following preparation raw materials in parts by weight:
    100 parts of epoxidized natural rubber, 1~30 parts of peanut meal, 0.05~0.8 parts of surfactants, 0.1~4 parts of coagulant, and 0.2~12 parts of vulcanization processing aids.

2. The epoxidized natural rubber composite according to claim 1, wherein, the epoxidization degree of the epoxidized natural rubber is 2~50.

3. The epoxidized natural rubber composite according to claim 1, wherein, the particle size of the peanut meal is 0.30~0.45 mm.

4. The epoxidized natural rubber composite according to claim 1, wherein, the surfactants include at least one of sodium dodecyl sulfonate, sodium dodecyl sulfate, sodium lignin sulfonate and calcium lignin sulfonate.

5. The epoxidized natural rubber composite according to claim 1, wherein, the coagulant is selected from the group consisting of methanol and ethanol.

6. The epoxidized natural rubber composite according to claim 1, wherein, the vulcanization processing aids include at least one of sulfur, N-t-butyl-2-benzothiazole sulfenamide, zinc oxide and stearic acid.

7. A preparation process of the epoxidized natural rubber composite of claim 1, wherein, it comprises the following steps:
- modifying a mixture of the peanut meal, the surfactants and water to provide a modified peanut meal dispersion;
- mixing the modified peanut meal dispersion with the epoxidized natural rubber to provide a latex-state compound;
- mixing the latex-state compound with the coagulant, wherein materials resulting from the step of mixing the latex-state compound with the coagulant are successively tableted, granulated and dried to provide a dry glue-state compound; and
- mixing the dry glue-state compound with the vulcanization processing aids, wherein materials resulting from the step of mixing the dry glue-state compound with the vulcanization processing aids are successively blended and vulcanized to provide the epoxidized natural rubber composite.

8. The preparation process according to claim 7, wherein an epoxidization degree of the epoxidized natural rubber is 2~50.

9. The preparation process according to claim 7, wherein a particle size of the peanut meal is 0.30~0.45 mm.

10. The preparation process according to claim 7, wherein the surfactants include at least one of sodium dodecyl sulfonate, sodium dodecyl sulfate, sodium lignin sulfonate and calcium lignin sulfonate.

11. The preparation process according to claim 7, wherein the coagulant is selected from the group consisting of methanol and ethanol.

12. The preparation process according to claim 7, wherein the vulcanization processing aids include at least one of sulfur, N-t-butyl-2-benzothiazole sulfenamide, zinc oxide and stearic acid.

13. The preparation process according to claim 7, wherein the step of modifying is performed at a temperature in the range of 30~80° C. for a time period in the range of 5~120 minutes under ultrasonic conditions with an ultrasonic power in the range of 500~700 W.

14. The preparation process according to claim 8, wherein the step of modifying is performed at a temperature in the range of 30~80° C. for a time period in the range of 5~120 minutes under ultrasonic conditions with an ultrasonic power in the range of 500~700 W.

15. The preparation process according to claim 9, wherein the step of modifying is performed at a temperature in the range of 30~80° C. for a time period in the range of 5~120 minutes under ultrasonic conditions with an ultrasonic power in the range of 500~700 W.

16. The preparation process according to claim 10, wherein the step of modifying is performed at a temperature in the range of 30~80° C. for a time period in the range of 5~120 minutes under ultrasonic conditions with an ultrasonic power in the range of 500~700 W.

17. The preparation process according to claim 11, wherein the step of modifying is performed at a temperature in the range of 30~80° C. for a time period in the range of 5~120 minutes under ultrasonic conditions with an ultrasonic power in the range of 500~700 W.

18. The preparation process according to claim 12, wherein the step of modifying is performed at a temperature in the range of 30~80° C. for a time period in the range of 5~120 minutes under ultrasonic conditions with an ultrasonic power in the range of 500~700 W.

19. The preparation process according to claim 13, wherein, a mass ratio of water to the epoxidized natural rubber is in the range of 1:0.6~1.

20. The preparation process according to claim 7, wherein the step of mixing the modified peanut meal dispersion is with the epoxidized natural rubber is performed under ultrasonic conditions with an ultrasonic power in the range of 500~700 W for a period in the range of 0.1~2 hour at a mixing temperature in the range of 30~80° C.

* * * * *